(12) United States Patent
Yamanashi et al.

(10) Patent No.: US 12,319,135 B2
(45) Date of Patent: Jun. 3, 2025

(54) BATTERY SUPPORT STRUCTURE FOR VEHICLE

(71) Applicant: ISUZU MOTORS LIMITED, Tokyo (JP)

(72) Inventors: Daiki Yamanashi, Fujisawa (JP); Keita Matsuzaki, Fujisawa (JP); Tetsuo Inoue, Fujisawa (JP); Shosuke Sakumoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 344 days.

(21) Appl. No.: 18/023,980

(22) PCT Filed: Sep. 17, 2021

(86) PCT No.: PCT/JP2021/034248
§ 371 (c)(1),
(2) Date: Feb. 28, 2023

(87) PCT Pub. No.: WO2022/070979
PCT Pub. Date: Apr. 7, 2022

(65) Prior Publication Data
US 2024/0025243 A1  Jan. 25, 2024

(30) Foreign Application Priority Data
Sep. 30, 2020  (JP) ................. 2020-165650

(51) Int. Cl.
*H01M 50/249* (2021.01)
*B60K 1/04* (2019.01)
(Continued)

(52) U.S. Cl.
CPC ............... *B60K 1/04* (2013.01); *B60L 50/66* (2019.02); *H01M 50/204* (2021.01);
(Continued)

(58) Field of Classification Search
CPC ............................ B60K 1/04; H01M 50/249
See application file for complete search history.

(56) References Cited

U.S. PATENT DOCUMENTS

2006/0096794 A1   5/2006  Yoshida
2012/0234615 A1*  9/2012  Takamura ............... B60L 50/52
                                                       180/68.5
(Continued)

FOREIGN PATENT DOCUMENTS

EP     2712748 A1      4/2014
JP     2006-123658 A   5/2006
(Continued)

OTHER PUBLICATIONS

Patent Cooperation Treaty, International Search Report, Application No. PCT/JP2021/034248, dated Sep. 17, 2021, in 5 pages.
(Continued)

*Primary Examiner* — Erez Gurari
(74) *Attorney, Agent, or Firm* — PROCOPIO, CORY, HARGREAVES & SAVITCH LLP

(57) ABSTRACT

A battery bracket 5 has a bracket upper part 26 that overlaps and is fixed to side members 2 from the outside in the vehicle width direction, and a bracket lower part 27 that extends from the bracket upper portion 26 lower than the side members 2, and the battery bracket 5 supports a battery 4 from below on the outer side of the bracket lower part 27 in the vehicle width direction. An undercross reinforcing member 10 has left and right undercross end parts 11 that are fixed to the left and right side members 2 and that extend downward, and an undercross intermediate part 12 that extends below the motor 6 in the vehicle width direction and that connects the left and right undercross end parts 11. The underross end parts 11 fixed to the side members 2 are fixed
(Continued)

so as to overlap the bracket lower part 27 of the battery bracket 5 from the inside in the vehicle width direction.

4 Claims, 2 Drawing Sheets

(51) Int. Cl.
  *B60L 50/60* (2019.01)
  *H01M 50/204* (2021.01)
  *H01M 50/264* (2021.01)

(52) U.S. Cl.
  CPC ....... *H01M 50/249* (2021.01); *H01M 50/264* (2021.01); *B60K 2001/0438* (2013.01); *H01M 2220/20* (2013.01)

(56) References Cited

U.S. PATENT DOCUMENTS

| | | | |
|---|---|---|---|
| 2013/0140101 A1* | 6/2013 | Lim | H01M 50/244 180/68.5 |
| 2015/0246606 A1* | 9/2015 | Katayama | B60L 58/21 180/65.1 |
| 2016/0250915 A1* | 9/2016 | Kobukata | B60K 1/04 180/68.5 |
| 2016/0297290 A1* | 10/2016 | Murata | B60K 1/04 |
| 2018/0366703 A1* | 12/2018 | Izumi | H01M 50/249 |
| 2020/0047818 A1 | 2/2020 | Ebisumoto et al. | |
| 2020/0331536 A1* | 10/2020 | Sloan | B60K 1/04 |
| 2022/0144064 A1* | 5/2022 | Tatsuwaki | H01M 50/242 |
| 2022/0396138 A1* | 12/2022 | Lang | H01M 50/242 |
| 2025/0055151 A1* | 2/2025 | Wang | H01M 50/262 |

FOREIGN PATENT DOCUMENTS

| | | |
|---|---|---|
| JP | 2009-083598 A | 4/2009 |
| JP | 2013-103575 A | 5/2013 |
| JP | 2014-069686 A | 4/2014 |
| JP | 2020-026231 A | 2/2020 |

OTHER PUBLICATIONS

Patent Cooperation Treaty, WOSA, Application No. PCT/JP2021/034248, dated Sep. 17, 2021, in 3 pages.

* cited by examiner

BATTERY SUPPORT STRUCTURE FOR VEHICLE

CROSS-REFERENCE TO RELATED APPLICATIONS

This application is US National Stage of International Patent Application PCT/JP2021/034248, filed Sep. 17, 2021, which claims benefit of priority from Japanese Patent Application 2020-165650, filed Sep. 30, 2020, the contents of both of which are incorporated herein by reference.

TECHNICAL FIELD

The present disclosure relates to a battery support structure for vehicle.

BACKGROUND ART

Patent Literature 1 discloses a bracket device configured by including a first bracket having a substantially L-shape that has a base portion fixed to a side surface portion of a chassis frame extending in a front-rear direction of a vehicle and has an extending portion extending outward from a side portion of the vehicle, and two second brackets that are fixed to an upper surface of the extending portion of the first bracket, extend in the front-rear direction of the vehicle, and are arranged at predetermined intervals in a vehicle width direction. A high voltage battery is fixed to an upper surface of the second bracket.

CITATION LIST

Patent Literature

Patent Literature 1: JP2006-123658A

SUMMARY OF INVENTION

Technical Problem

As described in Patent Literature 1, when the batteries are respectively arranged outside left and right side members (chassis frames) in the vehicle width direction that form a body frame and the batteries are supported on the side member via brackets, the batteries are in a cantilevered state supported by the side member. Therefore, when weight of the battery becomes excessive, the support of the battery by the side member becomes unstable, and thus there is a risk that the side member is deformed due to vibration input during traveling, or the like. When the side member is deformed, displacement of the battery increases and there is a risk of damage to the battery.

Accordingly, an object of the present disclosure is to provide a battery support structure that can stably support a battery arranged outside a side member in a vehicle width direction.

Solution to Problem

To achieve the object described above, a first aspect of the present disclosure is a battery support structure for vehicle in which a body frame has left and right side members extending in a vehicle front-rear direction on both sides in a vehicle width direction, a motor for driving a vehicle is arranged between the left and right side members and supported by the body frame, and a battery is arranged outside at least one of the left and right side members in the vehicle width direction so as to be aligned with the motor in the vehicle width direction, the battery support structure for vehicle including a battery bracket and an undercross reinforcing member.

The battery bracket has a bracket upper portion that is fixed to the one side member so as to overlap with the one side member from outside in the vehicle width direction and a bracket lower portion that extends below the one side member from the bracket upper portion, and supports the battery from below outside the bracket lower portion in the vehicle width direction. The undercross reinforcing member has left and right undercross end portions fixed to the left and right side members and extending downward and an undercross intermediate portion extending in the vehicle width direction below the motor and connecting the left and right undercross end portions. The undercross end portion fixed to the one side member is fixed to the bracket lower portion of the battery bracket so as to overlap with the bracket lower portion of the battery bracket from inside in the vehicle width direction.

In the configuration described above, a load of the battery acts inward in the vehicle width direction on the bracket lower portion positioned below the side member, and a moment that twists a lower portion of the side member inward in the vehicle width direction is input from the bracket upper portion to the side member. However, one undercross end portion of the undercross reinforcing member is fixed to the bracket lower portion so as to overlap with the bracket lower portion from inside in the vehicle width direction, and the other undercross end portion of the undercross reinforcing member is fixed to the other side member, and further the one undercross end portion and the other undercross end portion are connected by the undercross intermediate portion extending in the vehicle width direction. Therefore, the undercross reinforcing member functions effectively as a beam, and part of a load acting inward in the vehicle width direction from the battery on one side (for example, left side) to the bracket lower portion on one side (for example, left side) can be supported by the side member on the other side (for example, right side). Thus, it is possible to reduce the moment input from the bracket upper portion on one side (for example, left side) to the side member on one side (for example, left side), and stably support the battery.

Also, the undercross intermediate portion of the undercross reinforcing member extends in the vehicle width direction below the motor, so for example, when the motor is suspended from the body frame via a motor mount bracket, even when the motor drops due to breakage of the motor mount bracket or the like, the motor can be received by the undercross reinforcing member to prevent the motor from falling onto a road surface.

A second aspect of the present disclosure is the battery support structure of the first aspect, in which the left and right batteries are arranged outside the left and right side members in the vehicle width direction so as to be aligned with the motor in the vehicle width direction. The left and right battery brackets are arranged outside the left and right side members in the vehicle width direction. The left and right undercross end portions of the undercross reinforcing member are respectively fixed to the bracket lower portions of the left and right battery brackets so as to overlap with the bracket lower portions of the left and right battery brackets from inside in the vehicle width direction.

In the configuration described above, part of the load acting inward in the vehicle width direction from the battery on one side (for example, left side) to the bracket lower portion on one side (for example, left side) can be supported by the side member on the other side (for example, right side) and the battery bracket on the other side (for example, right side). Therefore, it is possible to support the battery more stably.

A third aspect of the present disclosure is the battery support structure of the first or second aspect, in which the undercross reinforcing member supports the motor from below.

In the configuration described above, the undercross reinforcing member for stabilizing a supporting state of the battery can also function as a member for motor mounting.

A fourth aspect of the present disclosure is the battery support structure of the first to third aspects, in which the battery bracket includes a bracket bottom plate portion that extends outward in the vehicle width direction from the bracket lower portion and on which the battery is placed, a bracket side plate portion that extends upward from substantially an entire inner end edge in the vehicle width direction of the bracket bottom plate portion, a bracket front plate portion that extends upward from substantially an entire vehicle front end edge of the bracket bottom plate portion and extends outward in the vehicle width direction from substantially an entire vehicle front end edge of the bracket side plate portion, and a bracket rear plate portion that extends upward from substantially an entire vehicle rear end edge of the bracket bottom plate portion and extends outward in the vehicle width direction from substantially an entire vehicle rear end edge of the bracket side plate portion. The bracket upper portion and the bracket lower portion are fixedly provided on the bracket side plate portion.

In the configuration described above, the battery bracket is three-dimensionally configured by four plate portions (bracket bottom plate portion, bracket side plate portion, bracket front plate portion, and bracket rear plate portion), and the bracket upper portion and the bracket lower portion are fixedly provided on the bracket side plate portion. Therefore, rigidity of the battery bracket can be increased and the load of the battery can be efficiently transmitted to the undercross reinforcing member.

Advantageous Effects of Invention

According to the present disclosure, it is possible to stably support a battery arranged outside a side member in a vehicle width direction.

DESCRIPTION OF EMBODIMENTS

Figure 1:
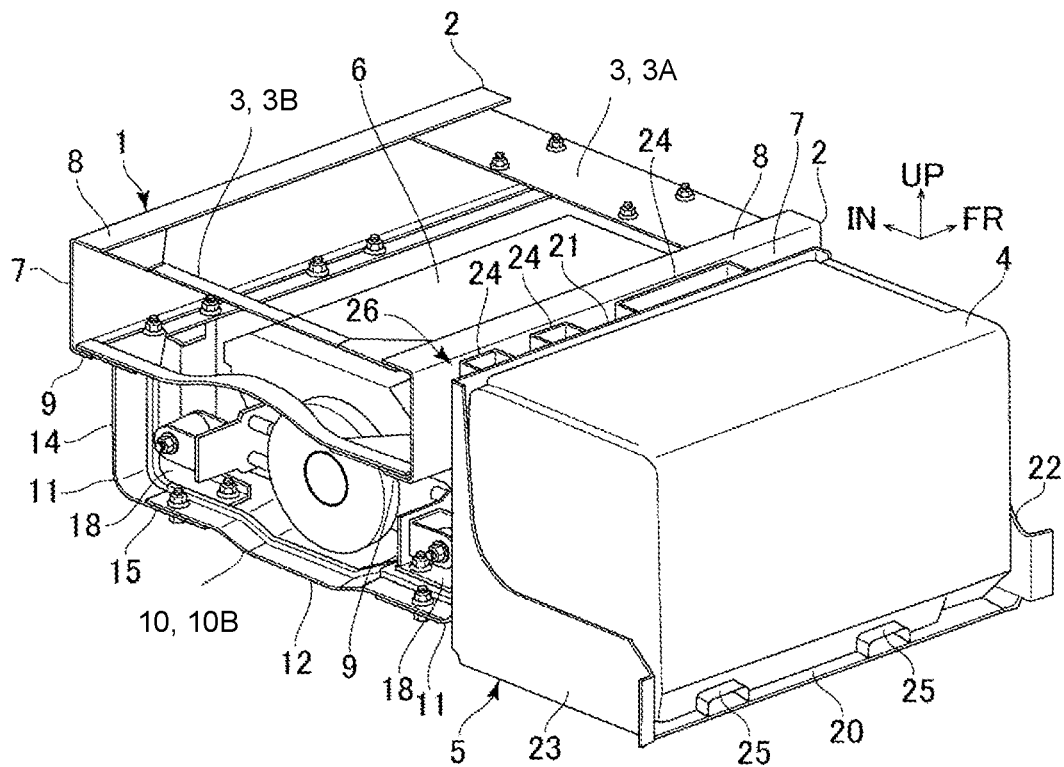
FIG. 1 is a perspective view of a battery support structure according to an embodiment of the present disclosure.

A battery support structure according to an embodiment of the present disclosure will be described below with reference to the drawings. In the drawings, an arrow FR indicates the front of a vehicle, an arrow UP indicates an upper direction, and an arrow IN indicates an inner side in a vehicle width direction. In the following description, a left-right direction means a left-right direction when the vehicle faces forward. Also, although in the present embodiment, batteries 4 are arranged on both left and right sides, the left and right batteries 4 and battery brackets 5 are configured in the same manner, so illustration and description of the left battery 4 and battery bracket 5 are omitted as appropriate.

Figure 2:
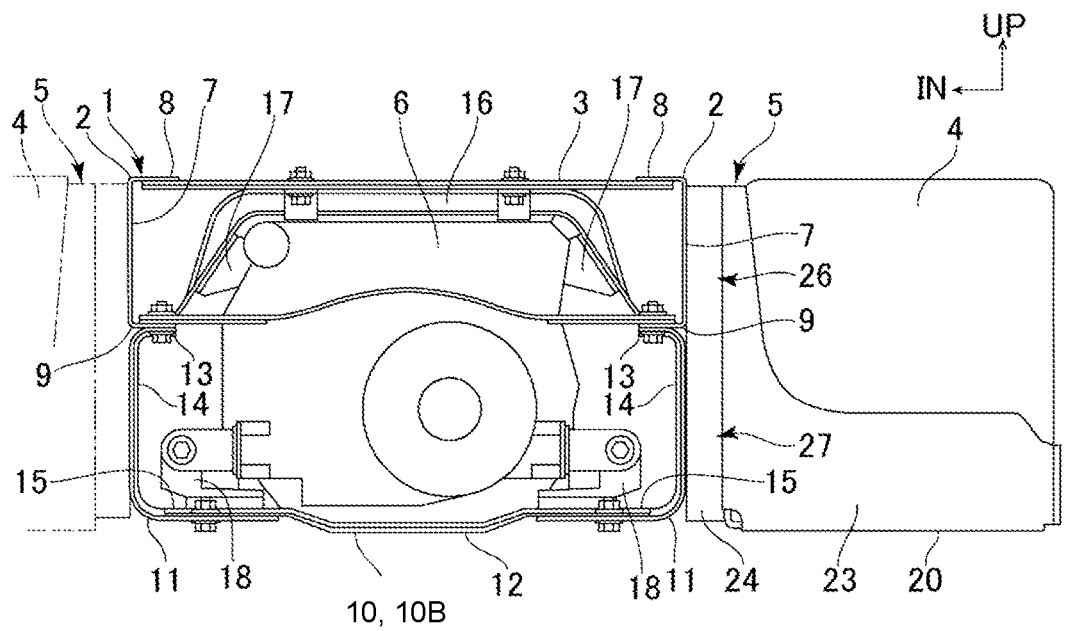
FIG. 2 is a rear view of the structure of FIG. 1 as seen from rear of a vehicle.
Figure 3:
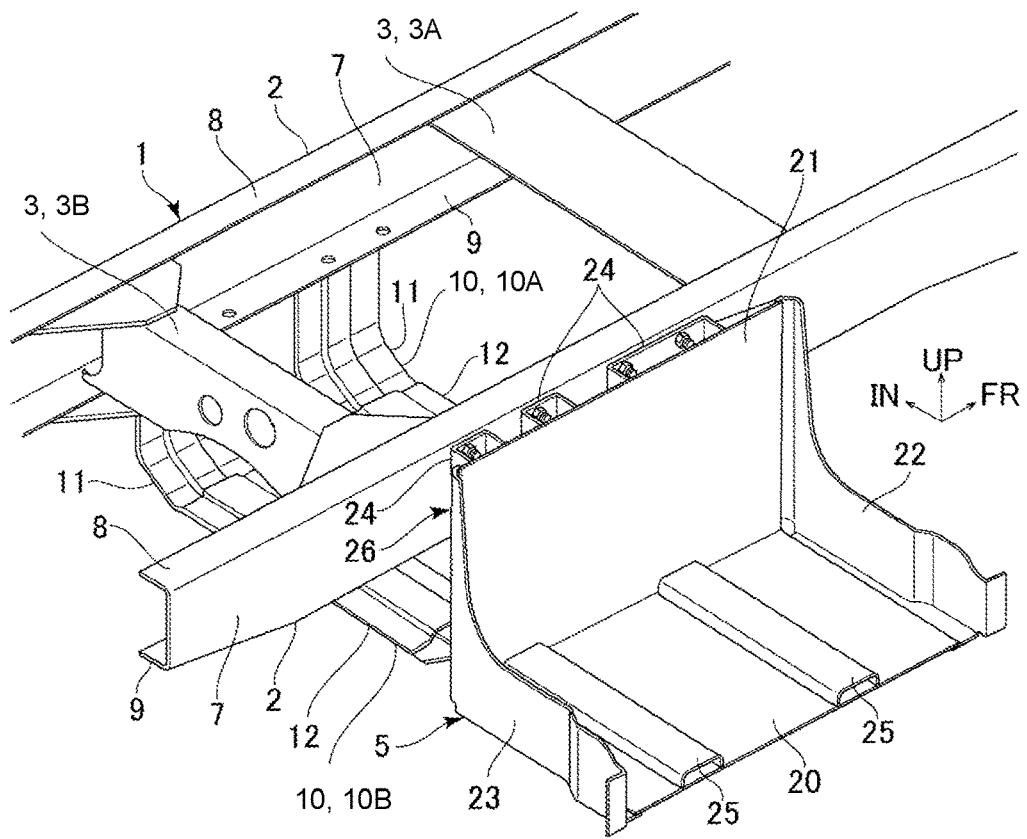
FIG. 3 is a perspective view illustrating a state in which a motor and a battery are removed from the structure of FIG. 1.
Figure 4:
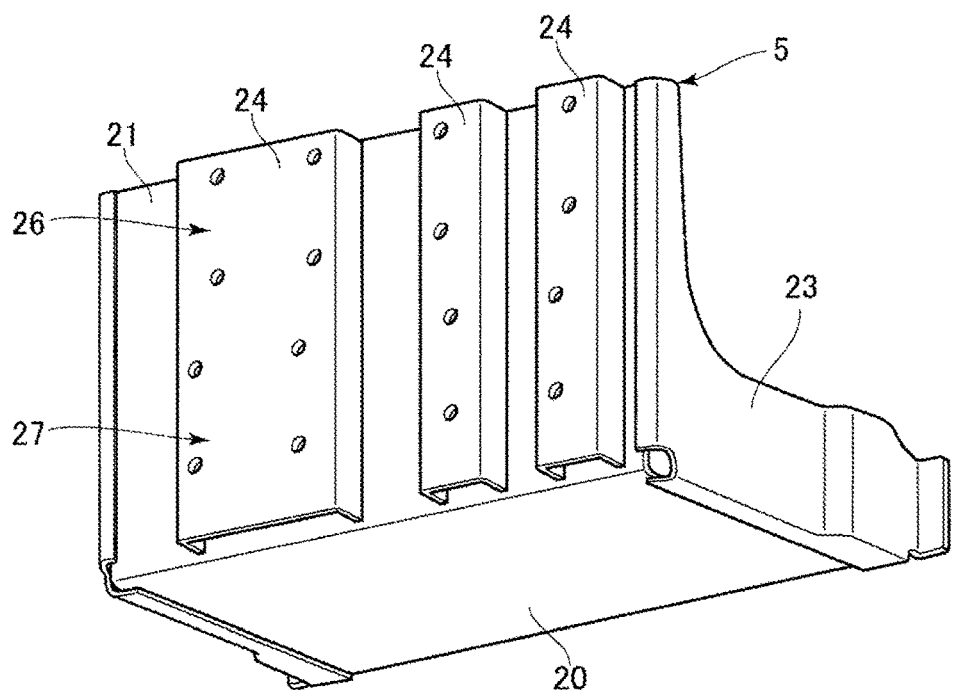
FIG. 4 is a perspective view of the battery bracket of FIG. 1.

As illustrated in FIGS. 1 to 3, a body frame 1 of the vehicle has a pair of left and right side members 2 extending in a vehicle front-rear direction, and a plurality of cross members 3 extending in the vehicle width direction and connecting the left and right side members 2. A motor 6 for driving the vehicle is arranged between the left and right side members 2 and supported by the body frame 1. The plurality of cross members 3 include a cross member 3A on a front side that extends in the vehicle width direction above a front side of the motor 6 and a cross member 3B on a rear side that extends in the vehicle width direction above a rear side of the motor 6. The left and right batteries 4 are arranged outside the left and right side members 2 in the vehicle width direction so as to be aligned with the motor 6 in the vehicle width direction. The side member 2 has a U-shaped cross section in which a side member upper plate portion 8 and a side member lower plate portion 9 respectively bend inward in the vehicle width direction from upper and lower edges of a side member side plate portion 7 standing upright along the vehicle front-rear direction and extend so as to face each other.

Front and rear undercross reinforcing members 10 are respectively arranged below the motor 6 on a vehicle front side and a vehicle rear side. The undercross reinforcing member 10 includes left and right undercross end portions 11 and an undercross intermediate portion 12, and is configured by fastening and fixing the left and right undercross end portions 11 to left and right end portions of the undercross intermediate portion 12. The undercross end portion 11 includes an undercross upper plate portion 13 that is fastened and fixed to a side member lower surface portion 9 so as to overlap with the side member lower surface portion 9 from below, an undercross side plate portion 14 that bends and extends downward from an outer end edge of the undercross upper plate portion 13 in the vehicle width direction, and an undercross lower plate portion 15 that bends and extends inward in the vehicle width direction from a lower end edge of the undercross side plate portion 14. The left and right end portions of the undercross intermediate portion 12 are fastened and fixed to the left and right undercross lower plate portions 15 so as to overlap with the left and right undercross lower plate portions 15 from above and below, and the undercross intermediate portion 12 extends in the vehicle width direction below the motor 6 and connects the left and right undercross end portions 11. The left and right undercross end portions 11 and the undercross intermediate portion 12 may be integrally formed instead of being formed separately.

The motor 6 on the vehicle front side is suspended from and supported by a motor mount member 16 fixed to a lower surface of the cross member 3A on the front side and extending in the vehicle width direction via a motor mount bracket 17 on the front side. The motor 6 on the vehicle rear side is supported from below by the undercross reinforcing member on the rear side via a motor mount bracket 18 on the rear side. That is, in the motor 6 on the vehicle rear side, the undercross reinforcing member 10B also functions as a member for motor mounting. The undercross reinforcing member 10A on the front side does not support the motor 6.

Left and right battery brackets 5 are respectively fixed to the left and right side members 2 on the outside in the vehicle width direction, and the left and right battery brackets respectively support the left and right batteries 4. The battery bracket 5 is roughly configured to include a bracket bottom plate portion 20, a bracket side plate portion 21, a bracket front plate portion 22, a bracket rear plate portion 23, a plurality of (three in the present embodiment) side plate reinforcing portions 24, and a plurality of (two in the present embodiment) bottom plate reinforcing portions 25.

The bracket bottom plate portion 20 extends outward in the vehicle width direction from below the side member 2 on the outside in the vehicle width direction. The bracket side plate portion 21 extends upward from substantially the entire inner end edge of the bracket bottom plate portion 20 in the vehicle width direction. The bracket front plate portion 22 extends upward from substantially the entire vehicle front end edge of the bracket bottom plate portion 20 and extends outward in the vehicle width direction from substantially the entire vehicle front edge of the bracket side plate portion 21. The bracket rear plate portion 23 extends upward from substantially the entire vehicle rear end edge of the bracket bottom plate portion 20 and extends outward in the vehicle width direction from substantially the entire vehicle rear end edge of the bracket side plate portion 21.

The side plate reinforcing portions 24 are long members having a U-shaped cross section and extend in an up-down direction while being separated from each other in the vehicle front-rear direction. The side plate reinforcing portion 24 is fixed to a vehicle width direction inner surface of the bracket side plate portion 21 by welding or the like, forms a closed cross section with the bracket side plate portion 21, and reinforces the bracket side plate portion 21. Upper portions of the three side plate reinforcing portions 24 form a bracket upper portion 26 and are fixed to the side member side plate portion 7 so as to overlap with the side member side plate portion 7 from outside in the vehicle width direction. Lower portions of the three side plate reinforcing portions 24 form a bracket lower portion 27 and extend below the side member 2 (the side member lower plate portion 9) from the bracket upper portion 26. Thus, the bracket upper portion 26 and the bracket lower portion 27 are fixedly provided on the bracket side plate portion 21, and the bracket bottom plate portion 20 extends outward in the vehicle width direction from a lower end portion (a lower end portion of the bracket lower portion 27) of the side plate reinforcing portion 24.

The bottom plate reinforcing portions 25 are long members having a U-shaped cross section and extend in the vehicle width direction while being separated from each other in the vehicle front-rear direction. The bottom plate reinforcing portion 25 is fixed to an upper surface of the bracket bottom plate portion 20 by welding or the like, forms a closed cross section with the bracket bottom plate portion 20, and reinforces the bracket bottom plate portion 20. The battery 4 is placed on the bracket bottom plate portion 20 and supported from below in a state in which the bottom plate reinforcing portions 25 are inserted into a bottom surface of the battery 4 having a concave-convex shape to restrict its movement in the vehicle front-rear direction.

The left and right undercross side plate portions 14 of the front and rear undercross reinforcing members 10 are respectively fixed to the bracket lower portions 27 (lower portions of the side plate reinforcing portions 24) of the left and right battery brackets 5 so as to overlap with the bracket lower portions 27 from inside in the vehicle width direction.

According to the present embodiment, the load of the battery 4 acts inward in the vehicle width direction on the bracket lower portion 27 positioned below the side member 2, and a moment that twists a lower portion of the side member 2 inward in the vehicle width direction is input from the bracket upper portion 26 to the side member 2. However, the left and right undercross end portions 11 of the undercross reinforcing member 10 are respectively fixed to the left and right bracket lower portions 27 so as to overlap with the left and right bracket lower portions 27 from inside in the vehicle width direction, and the left and right undercross end portions 11 are respectively fixed to the left and right side members 2, and further the left and right undercross end portions 11 are connected by the undercross intermediate portion 12 extending in the vehicle width direction. Therefore, the undercross reinforcing member 10 functions effectively as a beam, and part of a load acting inward in the vehicle width direction from the battery 4 on one side (for example, left side) to the bracket lower portion 27 on one side (for example, left side) can be supported by the side member 2 and battery bracket 5 on the other side (for example, right side). Thus, on both the left and right sides, it is possible to reduce the moment input from the bracket upper portion 26 to the side member 2, and stably support the battery 4.

Also, in the motor 6 on the vehicle front side, the undercross intermediate portion 12 of the undercross reinforcing member 10A extends in the vehicle width direction below the motor 6, so even when the motor 6 drops due to breakage of the motor mount bracket 17 that suspends and supports a front side of the motor 6, the front side of the motor 6 can be received by the undercross reinforcing member 10A to prevent the motor 6 from falling onto a road surface.

The battery bracket 5 is configured three-dimensionally by four plate portions (bracket bottom plate portion 20, bracket side plate portion 21, bracket front plate portion 22, and bracket rear plate portion 23), and the bracket upper portion 26 fixed to the side member 2 and the bracket lower portion 27 fixed to the undercross reinforcing member 10 are fixedly provided on the bracket side plate portion 21. Therefore, rigidity of the battery bracket 5 can be increased and the load of the battery 4 can be efficiently transmitted to the undercross reinforcing member 10.

As described above, the present disclosure is described based on the embodiment described above, but the present disclosure is not limited to the contents of the embodiment described above, and can be appropriately modified without departing from the scope of the present disclosure. That is, other embodiments, examples, operation techniques, and the like made by persons skilled in the art based on this embodiment are all included in the scope of the present disclosure.

For example, in the embodiment described above, an example in which the batteries 4 are arranged and supported on both the left and right sides is described, but the battery 4 may be arranged and supported on only one of the left and right sides.

This application is based on a Japanese patent application (Japanese Patent Application No. 2020-165650) filed on Sep. 30, 2020, the contents of which are incorporated herein by reference.

INDUSTRIAL APPLICABILITY

The present disclosure can be widely applied to a vehicle on which a battery is mounted.

REFERENCE SIGNS LIST

1: body frame
2: side member
3, 3A, 3B: cross member
4: battery
5 battery bracket
6: motor
7: side member side plate portion
8: side member upper plate portion
9: side member lower plate portion
10A, 10B: undercross reinforcing member
11: undercross end portion
12: undercross intermediate portion
13: undercross upper plate portion
14: undercross side plate portion
15 undercross lower plate portion
16: motor mount member
17, 18: motor mount bracket
20: bracket bottom plate portion
21: bracket side plate portion
22: bracket front plate portion
23: bracket rear plate portion
24: side plate reinforcing portion
25: bottom plate reinforcing portion
26: bracket upper portion
27: bracket lower portion

The invention claimed is:

1. A battery support structure for vehicle in which a body frame has left and right side members extending in a vehicle front-rear direction on both sides in a vehicle width direction, a motor for driving a vehicle is arranged between the left and right side members and supported by the body frame, and a battery is arranged outside a particular side member which is at least one of the left and right side members in the vehicle width direction so as to be aligned with the motor in the vehicle width direction, the battery support structure for vehicle comprising:
 a battery bracket that includes: a bracket upper portion that is fixed to the one side member so as to overlap with the particular side member from outside in the vehicle width direction; and a bracket lower portion that extends below the one side member from the bracket upper portion, and supports the battery from below outside the bracket lower portion in the vehicle width direction; and
 an undercross reinforcing member that includes: left and right undercross end portions fixed to the left and right side members and extending downward; and an undercross intermediate portion extending in the vehicle width direction below the motor and connecting the left and right undercross end portions,
 wherein the undercross end portion fixed to the particular side member is fixed to the bracket lower portion of the battery bracket so as to overlap with the bracket lower portion of the battery bracket from inside in the vehicle width direction.

2. The battery support structure for vehicle according to claim 1,
 wherein the batteries are arranged laterally outside the left and right side members in the vehicle width direction so as to be aligned with the motor in the vehicle width direction,
 wherein the battery brackets are arranged laterally outside the left and right side members in the vehicle width direction, and
 wherein the left and right undercross end portions of the undercross reinforcing member are respectively fixed to the bracket lower portions of the left and right battery brackets so as to overlap with the bracket lower portions of the left and right battery brackets from inside in the vehicle width direction.

3. The battery support structure for vehicle according to claim 1,
 wherein the undercross reinforcing member supports the motor from below.

4. The battery support structure for vehicle according to claim 1,
 wherein the battery bracket includes:
 a bracket bottom plate portion that extends outward in the vehicle width direction from the bracket lower portion, the bracket bottom plate portion being place with the battery thereon;
 a bracket side plate portion that extends upward from substantially an entire inner end edge in the vehicle width direction of the bracket bottom plate portion;
 a bracket front plate portion that extends upward from substantially an entire vehicle front end edge of the bracket bottom plate portion and extends outward in the vehicle width direction from substantially an entire vehicle front end edge of the bracket side plate portion; and
 a bracket rear plate portion that extends upward from substantially an entire vehicle rear end edge of the bracket bottom plate portion and extends outward in the vehicle width direction from substantially an entire vehicle rear end edge of the bracket side plate portion,
 wherein the bracket upper portion and the bracket lower portion are fixedly provided on the bracket side plate portion.

* * * * *